United States Patent Office 3,481,404
Patented Dec. 2, 1969

3,481,404
SANDSTONE ACIDIZING PROCESS
John L. Gidley, Houston, Tex., assignor to Esso Production Research Company, a corporation of Delaware
No Drawing. Continuation-in-part of application Ser. No. 691,178, Dec. 18, 1967. This application Feb. 3, 1969, Ser. No. 796,168
Int. Cl. E21b 43/27
U.S. Cl. 166—307           16 Claims

ABSTRACT OF THE DISCLOSURE

A method for improving the permeability of a sandstone or other siliceous formation surrounding a wellbore wherein an aqueous acid solution is injected into the formation, the injected acid is followed by from about $\frac{1}{10}$ to about 10 volumes of a hydrocarbon oil and a solvent miscible with oil and water, the ratio of the volume of said solvent to the volume of said oil being between about 0.02:1 to about 1:1, and fluids are thereafter produced from the formation into the wellbore.

CROSS-REFERENCE TO RELATED APPLICATIONS

This application is a continuation-in-part of application Ser. No. 691,178, filed in the United States Patent Office on Dec. 18, 1967.

BACKGROUND OF THE INVENTION

Field of the invention

This invention relates to the acid treatment of sandstones and similar subterranean formations surrounding oil wells, gas wells and similar boreholes.

Description of the prior art

Acid solutions are often used to stimulate the production of fluids from sandstones and other siliceous formations surrounding oil and gas wells. The methods employed, generally referred to as "sandstone acidizing process," normally involve the injection of an aqueous solution containing a mixture of hydrofluoric and hydrochloric acids into the formation and the subsequent production of spent acid from the formation into the wellbore. Although such methods are generally effective, experience has shown that many sandstones and similar siliceous formations do not respond to the acid treatment. Despite the injection of large quantities of acid, little or no improvement in permeability is obtained. This has restricted the application of sandstone acidizing and promoted the use of fracturing and other more expensive stimulation techniques.

SUMMARY OF THE INVENTION

This invention provides an improved method for acidizing sandstones and other siliceous formations to overcome formation damage and improve permeability. In accordance with the invention, it has now been found that many of the difficulties encountered in the past can be avoided by first injecting an aqueous solution of hydrochloric acid, hydrofluoric acid, or a mixture of hydrofluoric and hydrochloric acids into the subterranean formation and then following this with a hydrocarbon oil and a solvent miscible with oil and water as an afterflush. Laboratory and field tests have shown that this method has much broader application than methods employed in the past and that it often permits the successful stimulation of sandstones and other formations that do not respond to conventional sandstone acidizing treatment.

The reason for the improved results obtained in accordance with the invention are not fully understood. Studies indicate, however, that many of the difficulties encountered in sandstone acidizing operations are due to the formation of insoluble solids as the acid reacts with clay minerals present in the formation. These solids accumulate at the oil-water interfaces and promote the formation of stable emulsions which retard the movement of fluids through the pore spaces. The solvent used as an afterflush renders the solids water-wet and thus eliminates or retards the formation of such emulsions. It also tends to promote water wetting of the formation materials so that the relative permeability to oil is improved. Immiscible displacement of water by the afterflush and saturation of the oil with water in the presence of the solvent reduce the water saturation in the region near the wellbore and thus further improve the relative permeability to oil. These effects result in more effective stimulation than can be obtained with the acid alone. Other phenomena may also be involved.

DESCRIPTION OF THE PREFERRED EMBODIMENTS

The composition of the acid solution employed in carrying out the invention will depend in part upon the particular type of formation to be acidized. Although hydrofluoric acid is normally utilized for the acidizing of sandstones and similar materials, experience has shown that certain sandstone formations also respond to treatment with hydrochloric acid, apparently because of the presence of carbonates in combination with the siliceous materials. The method of the invention may therefore be carried out with an aqueous hydrochloric acid solution having a concentration in the range between about 5% and about 35% by weight, an aqueous hydrofluoric acid with a concentration in the range between about 1% and about 30% by weight, or an aqueous solution containing a mixture of hydrochloric and hydrofluoric acids. The mixtures generally used, referred to as mud acids because of their ability to dissolve drilling mud particles, normally have hydrogen fluoride contents between about 2 and about 6% by weight and hydrogen chloride contents between about 9 and about 13% by weight. Such mixtures may be prepared by adding crystalline ammonium bifluoride to a hydrochloric acid solution. The hydrogen chloride reacts with the bifluoride salt to form hydrogen fluoride and hence the more salt added the greater will be the hydrogen fluoride concentration and the lower will be the hydrogen chloride concentration. Other preparation methods, including the mixing of hydrofluoric and hydrochloric acid solutions, can also be employed. The use of such mixed acids is generally preferred.

The acid solutions described above will normally contain corrosion inhibitors designed to protect the tubular goods and other equipment against acid attack. Suitable inhibitors include the inorganic arsenic compounds and the acetylenic alcohols, thiophenols, heterocyclic nitrogen compounds, substituted thioureas, rosin amine derivatives, quaternary ammonium compounds and similar organic agents. Other additives may also be present. These include surfactants designed to function as demulsifiers, wetting agents, antisludge agents, and retarding agents; complexing agents which prevent the formation of gelatinous iron hydroxides; gelling agents for reducing the pressure drop through the tubing, retarding the acid reaction rate, and reducing fluid losses during acid fracturing operations; diverting agents intended for temporarily plugging the more permeable zones and thus promoting more uniform acid attack; and the like. A wide variety of additives designed to perform these and related functions are available commercially and will be familiar to those skilled in the art. The additives selected should, of course, be compatible with the acid solution and afterflush to be employed.

The afterflush utilized for purposes of the invention is normally a hydrocarbon oil containing a solvent miscible with both oil and water. In lieu of this, sequential banks of the solvent and oil may be employed as the afterflush. Suitable oils in general include low viscosity crude oils, heavy napthas, kerosenes, diesel fuels, heating oils, light gas oils, low level cracked residuums, liquefied petroleum gases, and the like. The use of diesel fuel, No. 2 fuel oil, or a similar low viscosity petroleum fraction is generally preferred. Liquefied propane, butane, or mixtures of propane and butane are particularly effective in formations containing low viscosity crude oils. A variety of organic solvents which are at least partially miscible with oil and water or brine under the conditions existing within the formation may be utilized in the afterflush employed in accordance with the invention. Suitable solvents include the low molecular weight alcohols such as methanol, ethanol, propanol, isopropanol, and tertiary butanol; aldehydes such as formaldehyde and acetaldehyde; ketones such as acetone; glycol ethers such as ethylene glycol monomethyl ether, ethylene glycol dimethyl ether, ethylene glycol monoethyl ether, ethylene glycol monopropyl ether, and ethylene glycol monobutyl ether; and the like. The glycol ethers typified by ethylene glycol monobutyl ether have been found to be particularly effective for purposes of the invention and are therefore preferred.

The amount of solvent employed and the manner in which it is used in the afterflush are governed in part by the particular solvent selected and the particular formation to be treated. In general, however, it is preferred to add the solvent to the hydrocarbon oil in a quantity such that the ratio of the volume of the solvent to the volume of the oil is from about 0.02:1 to about 1:1 and then inject from about 1/10 to about 10 volumes of the resulting solution as an afterflush for each volume of acid used. Particularly outstanding results have been obtained by using from about 1/4 to about 5 volumes of diesel oil containing ethylene glycol monobutyl ether or a similar solvent in a concentration between about 5% and about 20% by volume for each volume of acid injected. The use of solutions containing the solvents in these concentrations is therefore preferred. In lieu of this, however, the solvent may be injected and immediately followed by the diesel fuel or similar hydrocarbon oil. If this latter procedure is used, it is normally preferred to inject from about 5 to about 50 gallons of solvent per 100 gallons of acid and follow this with from about 10 to about 200 gallons of oil per 100 gallons of acid.

The procedures used to prepare the well in which the method of the invention is to be carried out will depend in part upon the type of well that is to be treated. In a pumping oil well, for example, it is normally preferred to unseat the packer and inject brine to displace fluids standing in the wellbore. The sucker rods, pump and associated equipment can then be removed from the well. Accumulated wax and other foreign material present in the perforations or adhering to the face of the producing formation can be removed by running a scratcher or similar device within the producing interval. A string of tubing provided with a packer is then lowered into the wellbore to a point above the zone to be treated and the well is filled with diesel oil. In a flowing oil well, the fluids may be pumped directly into the formation through the tubing without unseating the packer. Similarly, gas wells generally require little or no preparation. Since the tubing in such a well is normally filled with gas and no pumping equipment is present, the well can be killed by simply injecting diesel oil through the tubing string. The preparation steps employed may thus be similar to those used in conventional acid treating operations and will therefore be familiar to those skilled in the art.

Following preparation of the well, the method of the invention is carried out by injecting the acid solution to be used into the producing formation surrounding the wellbore. It is normally preferred that the injection pressure be kept below that necessary to fracture the formation so that penetration of the acid into the formation matrix occurs. The injection rate selected should generally be sufficient to keep the pressure just below that necessary to fracture the formation. To achieve maximum penetration of the acid, the rate generally should be increased as the matrix permeability increases due to acid attack. If the interval being treated is more than about 5 feet in thickness or if more than five perforations are open to the wellbore, it may be advisable to include in the acid solution an oil soluble, acid insoluble powdered diverting agent to promote balanced acid invasion of the entire zone. Commercially available cyclopentadiene resins and similar oil soluble, water insoluble polymers are suitable for this purpose. Such materials may be employed in concentrations ranging from about 0.5 pound per perforation up to about 5 pounds per perforation, depending upon the permeability of the formation.

After the acid solution has been injected, the afterflush is introduced into the formation behind the acid. Again the injection rate should be maintained at a level just below that at which fracturing of the formation is apt to occur. Injection of the afterflush is continued until the desired quantity of solvent-oil solution or solvent and oil has been introduced. As the afterflush displaces the acid into the formation, it tends to reduce the water saturation near the wellbore, to improve the relative permeability to oil, and to render the formation surfaces and precipitated solids water wet. The well may be returned to production as soon after the afterflush has been injected as practicable. No specific waiting period is required. There are indications that leaving the spent acid in the formation for long periods has detrimental effects but many wells have been shut in overnight following injection of the afterflush without detrimental results.

In lieu of injecting all of the acid and then following this with all of the afterflush as described above, the acid and afterflush can each be injected in two or more stages. By injecting afterflush behind the acid in each stage, more uniform treatment of the formation and better overall results can sometimes be obtained. The procedure described above may also be modified by the use of a preflush of hydrochloric acid, formic acid, acetic acid or a similar material capable of reacting with carbonates present in the formation. The use of such a preflush is advantageous because it promotes the removal of carbonates prior to introduction of the mud acid and thus permits more effective utilization of the hydrogen fluoride in the mud acid. It is also advantageous in many cases to include a surface active agent having water wetting properties in the afterflush solution. An ionic surfactant such as sodium tetradecyl sulfate has been found to be particularly effective for this purpose but other surfactants may also be used. The nature and objects of the invention are further illustrated by the following examples.

EXAMPLE I

Three offshore oil wells completed in a sandstone formation containing carbonates were treated with 100 gallons of a 15% hydrochloric acid solution per foot of perforated interval. Five hundred gallons of diesel oil containing 10% by volume of ethylene glycol monobutyl ether was injected into each well immediately following injection of the acid. This treatment was then immediately repeated in each well without the intermediate introduction of any other fluids. The wells were shut in for two hours and then swabbed to promote the production of fluids back into the wellbores. All three wells came in as producers without any indication of residual damage. Prior to treatment with the hydrochloric acid and the diesel oil-solvent afterflush, none of the three wells would produce any formation fluids. Earlier attempts to stimulate these wells with conventional acid treating procedures and surfactant treatments had produced no response whatsoever. The method of the invention was thus successful despite the failure of conventional stimulation methods.

Following the treatment of these initial three wells, five additional wells in the same field were treated in similar fashion. Four of the five wells came in as flowing oil wells following the treatment. In the fifth well, the fluid level following treatment was about 3000 feet higher than it had been prior to treatment and production was satisfactory following the installation of a gas lift system. In each of the eight wells, the method of the invention was thus successful in a field where no response was obtained with conventional stimulation techniques.

EXAMPLE II

The method of the invention was used to stimulate production from a well producing from an 18 foot perforated interval in a sandstone formation. Prior to the treatment, the well was producing four barrels of crude oil and one barrel of water per day. The treatment consisted of pumping 900 gallons of 15% hydrochloric acid solution into the formation, following this with 900 gallons of mud acid containing 12% hydrochloric acid and 3% hydrofluoric acid, and then injecting 900 gallons of diesel oil containing 100 gallons of ethylene glycol monobutyl ether. Twenty-five barrels of lease crude oil was used as a displacement fluid for displacing the afterflush into the formation. During the treatment, the surface pressure dropped from 200 pounds per square inch gauge at an injection rate of 0.5 barrel per minute to 0 pound per square inch gauge after the acid was in the formation. The well was immediately returned to production following the treatment. Four days later, the well was producing 80 barrels of oil per day with no water production.

EXAMPLE III

A well completed in a sandstone formation was treated in accordance with the invention by injecting 250 gallons of 15% hydrochloric solution, 250 gallons of mud acid containing about 12% hydrochloric acid and about 3% hydrofluoric acid, and an afterflush of 250 gallons of lease crude oil containing 10% by volume of ethylene glycol monobutyl ether. Two previous acid treatments using 15% hydrochloric acid had resulted in productivity increases of less than 15 barrels of oil per day. Just prior to the treatment carried out in accordance with the invention, the well was producing no fluids at all. After treatment with the hydrochloric acid, mud acid, and crude oil-solvent afterflush, the well produced 112 barrels of oil per day and about 13 barrels of water per day. The stimulation treatment paid for itself in about two days. In contrast to this, an adjacent well completed in the same formation showed an increase of only 43 barrels of oil per day following a small fracture treatment designed to overcome formation damage. The acid treatment carried out in accordance with the invention and the small fracture treatment both cost about the same. It can thus be seen that the acid treatment followed by the afterflush was considerably more effective than the fracture treatment.

EXAMPLE IV

The results of additional tests carried out in accordance with the invention are set forth in the following table.

RESULTS OF ACID-AFTERFLUSH TESTS

| Well | Treatment | Production Before Treatment | | Production After Treatment | |
|---|---|---|---|---|---|
| | | Oil, bbls./day | Total fluids, bbls./day | Oil, bbls./day | Total fluids, bbls./day |
| A | 250 gal. 15% HCl<br>500 gal. mud acid<br>250 gal. oil containing 10 vol. percent ethylene glycol monobutyl ether. | 18 | 18 | 25 | 33 |
| B | 250 gal. 15% HCl<br>500 gal. mud acid<br>250 gal. oil containing 10 vol. percent ethylene glycol monobutyl ether. | 0 | 0 | 38 | 54 |
| C | 250 gal. 15% HCl<br>500 gal. mud acid<br>250 gal. oil contianing 10 vol. percent ethylene glycol monobutyl ether. | 3 | 17 | 7 | 55 |
| D | 250 gal. 15% HCl<br>500 gal. mud acid<br>250 gal. oil containing 10 vol. percent ethylene glycol monobutyl ether. | 2 | 7 | 5 | 31 |
| E | 250 gal. 15% HCl<br>500 gal. mud acid<br>250 gal. oil containing 10 vol. percent ethylene glycol monobutyl ether. | 1 | 2 | 75 | 85 |
| F | 250 gal. 15% HCl<br>500 gal. mud acid<br>250 gal. oil containing 10 vol. percent ethylene glycol monobutyl ether. | 24 | 79 | 84 | 131 |
| G | 250 gal. 15% HCl<br>500 gal. mud acid<br>500 gal. oil containing 10 vol. percent ethylene glycol monobutyl ether. | 0 | 0 | 9 | 22 |
| H | 500 gal. mud acid<br>250 gal. oil containing 10 vol. percent ethylene glycol monobutyl ether. | 0 | 0 | 112 | 128 |
| I | 450 gal. mud acid<br>250 gal. oil containing 10 vol. percent ethylene glycol monobutyl ether. | 0 | 0 | 122 | 126 |
| J | 400 gal. mud acid<br>250 gal. oil containing 10 vol. percent ethylene glycol monobutyl ether. | 0 | 0 | 107 | 107 |

The data set forth above demonstrate the surprising effectiveness of the method of the invention. Several of the wells treated were located in formations which do not respond to conventional acid treating procedures. Despite this, substantial improvements in production were obtained.

I claim:

1. A method for improving the permeability of a siliceous formation surrounding a wellbore which comprises injecting an aqueous acid solution capable of dissolving mineral constituents present in said formation into the formation, injecting from about 1/10 to about 10 volumes of a hydrocarbon oil and a solvent at least partially miscible with oil and water per volume of acid solution into the formation behind said acid solution, the ratio of the volume of said solvent to the volume of said oil being between about 0.02:1 and about 1:1, and thereafter producing fluids from said formation into the wellbore.

2. A method as defined by claim 1 wherein said hydrocarbon oil and said solvent are mixed with one another to form a solvent-oil solution and thereafter injected into said formation.

3. A method as defined by claim 2 wherein said acid solution and said solvent-oil solution are injected into said formation in stages, each portion of the acid solution being followed by a portion of the solvent-oil solution.

4. A method as defined by claim 2 wherein from about 1/4 to about 5 volumes of said solvent-oil solution is injected into said formation for each volume of acid injected.

5. A method as defined by claim 2 wherein said solvent constitutes from about 5% to about 20% by volume of said solvent-oil solution.

6. A method as defined by claim 1 wherein said solvent and said hydrocarbon oil are injected into said formation sequentially.

7. A method as defined by claim 1 wherein said acid solution is a solution of hydrochloric acid.

8. A method as defined by claim 1 wherein said solvent is an ethylene glycol ether.

9. A method as defined by claim 1 wherein said acid solution is a mud acid containing a mixture of hydrochloric and hydrofluoric acids.

10. A method as defined by claim 1 wherein said solvent is ethylene glycol monobutyl ether.

11. A method as defined by claim 1 wherein said hydrocarbon oil comprises liquefied petroleum gases.

12. A method for stimulating production from a subterranean formation surrounding a wellbore which comprises injecting a solution of hydrofluoric acid into said formation, displacing said solution in said formation with an oil containing from about 5% to about 20% by volume of ethylene glycol monobutyl ether, and thereafter producing fluids from said formation into the wellbore.

13. A method as defined by claim 12 wherein from about 1/10 to about 10 volumes of said oil containing said ether is injected into said formation for each volume of acid injected.

14. A method as defined by claim 12 wherein said hydrocarbon oil comprises a diesel oil.

15. A method as defined by claim 12 wherein said hydrocarbon oil comprises liquefied petroleum gases.

16. A method as defined by claim 12 wherein said solution of hydrofluoric acid contain hydrochloric acid in addition to the hydrofluoric acid.

References Cited

UNITED STATES PATENTS

| | | | |
|---|---|---|---|
| 1,969,230 | 8/1934 | McMillen | 166—42 |
| 2,094,479 | 9/1937 | Vandergrift et al. | 166—42 |
| 2,118,386 | 5/1938 | Swinehart | 166—42 |
| 2,356,205 | 8/1944 | Blair et al. | 252—8.55 |
| 2,367,350 | 6/1945 | Heigl | 252—8.55 |
| 2,885,004 | 5/1959 | Perry | 166—42 |
| 3,131,759 | 5/1964 | Slusser et al. | 166—42 X |
| 3,233,672 | 2/1966 | Carpenter | 166—42 |
| 3,254,718 | 6/1966 | Dunlap | 166—42 |
| 3,343,602 | 9/1967 | Knox et al. | 166—42 |

STEPHEN J. NOVOSAD, Primary Examiner